United States Patent [19]
Leiber et al.

[11] Patent Number: 4,753,492
[45] Date of Patent: Jun. 28, 1988

[54] MONITORING ARRANGEMENT FOR ANTI-SKID AUTOMOTIVE BRAKE SYSTEM

[75] Inventors: Heinz Leiber, Oberriexingen; Jürgen Gerstenmeier, Ilsfeld, both of Fed. Rep. of Germany

[73] Assignee: Robert Bosch GmbH, Stuttgart, Fed. Rep. of Germany

[21] Appl. No.: 49,034

[22] Filed: Apr. 27, 1987

Related U.S. Application Data

[63] Continuation of Ser. No. 676,016, Nov. 29, 1984, abandoned.

[30] Foreign Application Priority Data

Dec. 7, 1983 [DE] Fed. Rep. of Germany ....... 3344183

[51] Int. Cl.$^4$ ................................................ B60T 3/04
[52] U.S. Cl. ..................................... 303/92; 303/100; 303/114; 303/DIG. 3
[58] Field of Search ............... 303/84 R, 84 A, 10, 303/20, 92, 114; 188/151 A; 417/12; 200/82 D, 82 A, 82 R; 340/52 C, 60, 626; 73/711, 714, 735; 137/552; 92/363 A; 192/129 A

[56] References Cited

U.S. PATENT DOCUMENTS

| | | | |
|---|---|---|---|
| 2,935,875 | 5/1960 | Eggers et al. | 73/735 |
| 2,947,579 | 8/1960 | Woodworth | 303/DIG. 4 |
| 3,180,152 | 4/1965 | Metzger et al. | 73/735 |
| 3,251,032 | 5/1966 | Brayton | 340/60 |
| 3,402,972 | 9/1968 | Cooper et al. | 303/20 |
| 3,529,288 | 9/1970 | Dobrikin | 340/60 |
| 3,808,449 | 4/1974 | Peruglia | 188/151 A |
| 3,836,206 | 9/1974 | Leiber | 303/10 |
| 3,948,568 | 4/1976 | Leiber | 303/92 |
| 3,963,375 | 6/1976 | Curtis | 417/12 |
| 4,357,054 | 11/1982 | Leiber | 303/10 |
| 4,523,791 | 6/1985 | Belart et al. | 303/92 |
| 4,568,130 | 2/1986 | Leiber | 303/92 |
| 4,575,160 | 3/1986 | Leiber et al. | 303/110 |

FOREIGN PATENT DOCUMENTS

| | | | |
|---|---|---|---|
| 2345860 | 3/1975 | Fed. Rep. of Germany | 303/92 |
| 2360139 | 5/1975 | Fed. Rep. of Germany | 303/10 |

OTHER PUBLICATIONS

SAE Technical Paper Series No. 830 483 dated Feb. 28–Mar. 4, 1983, "The First Compact 4-Wheel Antiskid System with Integral Hydraulic Booster".

*Primary Examiner*—John W. Caldwell, Sr.
*Assistant Examiner*—Alvin Oberley
*Attorney, Agent, or Firm*—Frishauf, Holtz, Goodman & Woodward

[57] ABSTRACT

To improve the reliability of operation of an anti-skid braking system, and to provide a warning indication if malfunction should occur in such a system (ABS), a pressure-responsive switch (6, 62, 63) having two switching elements ($S_1$, $S_2$; 43a, 44a, 43b, 44b, 46a, 46b, 47a, 47b) is connected to a pressurized hydraulic brake fluid connection line to a control valve for a vehicle brake, the switches providing, respectively, control signals of different levels of pressure applied thereto, and, in case of failure of one switch to respond to a higher pressure level, at which time a pump motor is to be energized to resupply the pressure, a second switch, responsive to a lower pressure value, is provided, providing a further warning indication and, if appropriate, disconnecting the ABS with a disconnect indication to the operator that the braking system is placed back under operator control.

17 Claims, 3 Drawing Sheets

MONITORING ARRANGEMENT FOR ANTI-SKID AUTOMOTIVE BRAKE SYSTEM

This application is a continuation, of application Ser. No. 676,016, filed Nov. 29, 1984, abandoned.

Reference to related applications, the disclosure of which is hereby incorporated by reference, assigned to the assignee of the present application:

U.S. Ser. No. 620,458, filed June 14, 1984, LEIBER now U.S. Pat. No. 4,568,130;

U.S. Ser. No. 620,466, filed June 14, 1984, LEIBER et al now U.S. Pat. No. 4,575,160.

SAE Technical Paper Series No. 830 483, dated Feb. 28–Mar. 4, 1983. The First Compact 4-Wheel Anti-skid System with Integral Hydraulic Booster.

The present invention relates to automatic braking systems (ABS), customarily referred to as anti-skid or anti-lock braking systems, for use in vehicles, and especially automotive vehicles, and more particularly to an arrangement which monitors the operability and proper functioning of such an ABS.

BACKGROUND

It has previously been proposed to provide anti-skid systems in which a pump supplies hydraulic fluid to form a pressure source for a closed braking circuit. Valves are included in the braking circuits to, respectively, control admission, maintenance of pressurized brake fluid, or drainage of pressurized brake fluid in accordance with operating requirements of the vehicle. Such systems may include a supply valve which supplies pressurized brake fluid to the actual control valve which varies the braking fluid pressure at the brake, the supply valve insuring that, at all times, sufficient pressurized brake fluid is available for the actual hydraulic brake cylinder-piston arrangement at the respective brakes. It has already been proposed to monitor the pressure within the braking fluid pressure supply which, if the pressure should drop below a predetermined level, issues a warning signal and/or a switching signal which controls supply of the pressurized brake fluid to the supply valve and, rather, permits brake actuation under control from the master cylinder of the braking system.

Braking systems of the above-mentioned type are discussed in an SAE ("Society of Automotive Engineers") report, which describes the system including a warning switch constructed as an opening-type switch which provides an immediate indication if a signal line is interrupted since interruption of the signal line will also simulate opening of the switch. Such opening of the switch or interruption of the signal line is indicated, representing either electrical malfunction or failure of the pressure which is being monitored to drop below a predetermined level.

THE INVENTION

It is an object to improve the warning system to insure proper operation thereof so that, even if there should be some malfunction in the warning system itself, drop in pressure will be reliably indicated.

Briefly, the pressure fluid supply system has at least two switch means coupled thereto, individually connected for individually monitoring the pressure supply system or assembly to provide hydraulic pressure to the brake valve. The system, thus, provides for redundancy in which, one of the switches, preferably, is set for a first switching threshold which normally causes operation of an electrical pressure supply pump to reestablish operating pressure to the hydraulic fluid circuit. If a failure should occur within this system, and pressure continues to drop, the switch will reach a third switching position which provides a warning signal. In addition, a second switch is provided which, at the second lower threshold level, responds in case the first switch did not properly respond.

In accordance with a feature of the invention, the output circuits of the switches are logically interlocked in such a manner that they are mutually checking, and the circuit arranged to be fail-safe, that is, upon malfunction of any component, a warning indication will be given. The warning indication may be of two kinds—first a warning lamp or indication and, secondly, a lock-out of the automatic brake control system (ABS) pending repair thereof, coupled with an indication that the ABS is disconnected and inoperative, leaving the operator of the vehicle to control braking pressure as if no automatic braking control system were present.

The pressure which is applied from the supply valve to the actual brake control valve can be the pressure of the pressure supply system itself; preferably, however, and as described for example in the referenced applications Ser. No. 620,458 and Ser. No. 620,466, both filed June 14, 1984, now U.S. Pat. Nos. 4,568,130 and 4,575,160, the pressure may be a supply pressure derived from the main or master cylinder, and which is to be supplied to the piston or pistons of the master cylinder. The supply valve then can separate the master cylinder from the anti-skid control valves during operation of the anti-skid system (ABS) or, selectively, supply hydraulic pressure, additionally, to the valves controlling the actual brake cylinders, or to the brake cylinders themselves.

DRAWINGS

DETAILED DESCRIPTION

Figure 1:
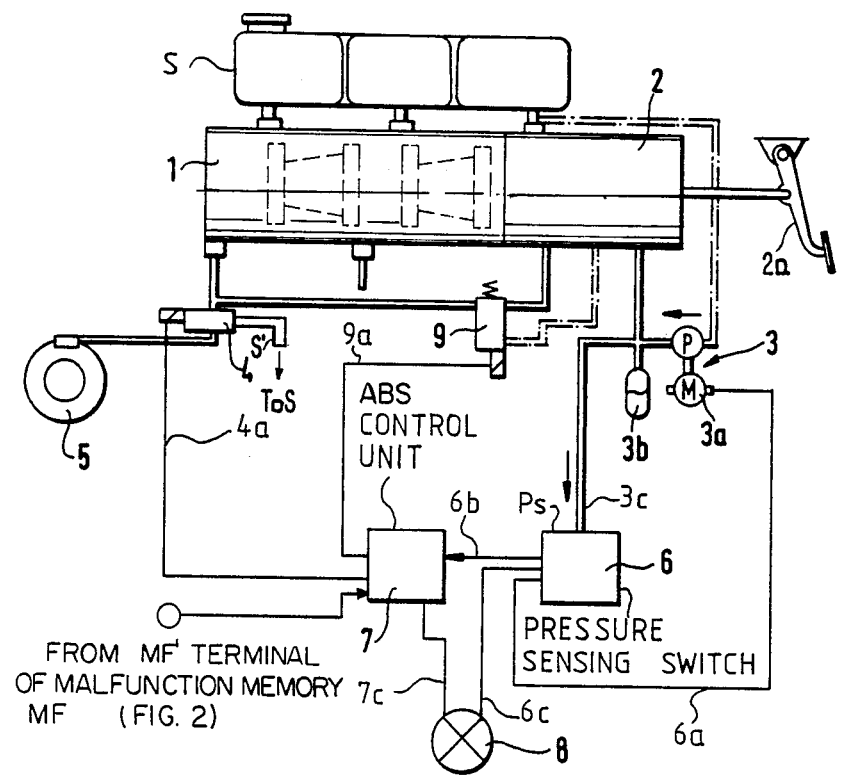
FIG. 1 is a schematic diagram of the system of the present invention, in which all parts not necessary for an understanding thereof, including drain lines and the like, have been omitted.

A master cylinder 1 is connected to a pressure supply system 3 including a pump P coupled to a pump motor 3a and a pressure vessel or storage vessel 3b. A brake pressure amplifier 2 controlled by an operator controllable brake pedal 2a is coupled to the master cylinder 1. The brake pressure is applied via a control valve 4 to the brake cylinder of a wheel 5. Only one control loop for one wheel is shown to simplify the drawings; other valves 4 can be coupled to other wheels 5 similar to the one shown. Only one drain line S' from valve 4 is shown. All other drain and return lines have been omitted from the diagram of FIG. 1 for simplicity, and can be installed as well known in systems of this kind, for example as described in the referenced applications Ser. No. 620,458 and Ser. 620,466, both filed June 14, 1984, now U.S. Pat. Nos. 4,568,130 and 4,575,160.

A pressure sensing switch 6 is coupled to receive pressure fluid from the pumped pressure supply system 3. The switching signals from the pressure sensing switch 6 are applied to an ABS-electronic control unit 7 to which also a sensor provided at wheel 5 is coupled in known manner. The switch 6 as well as the control unit 7 are connected to a warning indicator lamp 8. The pressure sensing switch 6 is connected through a connecting line 6a to the motor 3a. The output signals from the control unit 7 control a supply valve 9 as well as the control valve 4.

The anti-brake lock system (ABS) control unit 7, as well known in the literature, controls operation of the respective valves 4 and 9 via lines 9a and 4a. Lamp 8 is controlled by lines 6c, 7c.

During operation of the ABS, the supply valve 9 provides pumped pressurized supply fluid from the hydraulic brake pressure amplifier, for example of the power-brake type, to the hydraulic brake circuit. This prevents exhaustion of pressurized braking fluid in the master cylinder 1 if the valve 4 is controlled to drain some of the brake fluid back to a supply sump S, through drain line S', in accordance with well known operation of an ABS.

For safety, it is necessary to monitor supply of pumped pressurized brake fluid, reliably and uninterruptedly. In case there is a pressure drop in the pumped supply system 3 and the control value 4 remains energized, a complete loss of brake fluid pressure may result. One embodiment of such a monitoring system is shown in FIG. 2.

Figure 2:
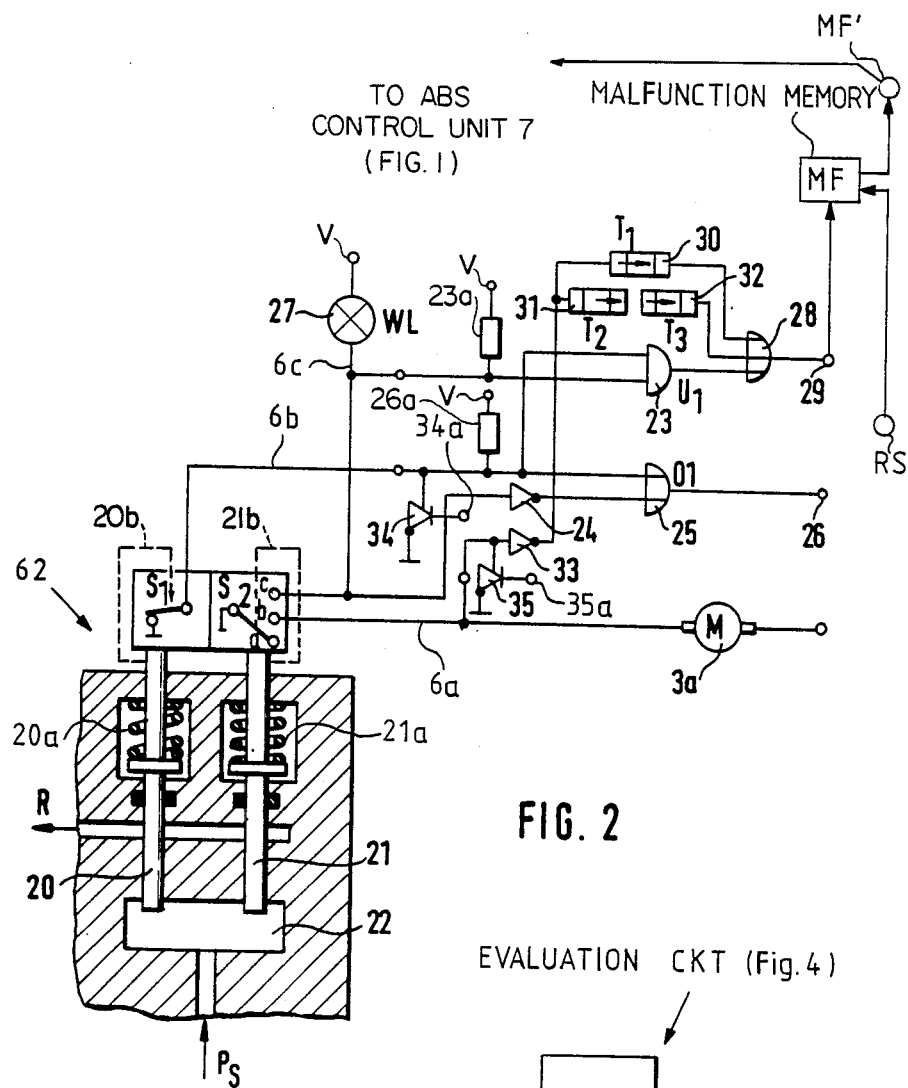
FIG. 2 is a detailed diagram of the control valve and switching unit in connection therewith.

Two pressure-responsive piston elements 20, 21—see FIG. 2—are located to fit into a pressure chamber 22 which is supplied with pressurized brake fluid in accordance with the arrow $P_S$, that is, for example at the inlet connection of the unit 6 (FIG. 1). If the pressure in chamber 22 is adequate for proper operation, both piston elements 21, 22 are pushed to their topmost position and the terminals S1, S2, coupled to the piston elements as schematically shown by broken lines 20b, 21b, will be connected as shown in solid lines in FIG. 2. Unit 62, corresponding to unit 6 of FIG. 1, thus includes the pressure supply chamber 22, the pressure-responsive elements and the switches $S_1$, $S_2$.

The piston elements 20, 21 are normally biassed downwardly by suitable springs 20a, 21a. A return line R is provided to accept any leakage which might arise, and return leakage fluid to the supply sump S (FIG. 1).

The switching thresholds of the switches $S_1$, $S_2$, determined for example by suitable selection of the diameters of the piston elements 20, 21 and the spring constants of the springs 20a, 21a are so arranged that, if the pressure drops, the switch terminal $S_2$ will change from the terminal position a to an intermediate position b. In the intermediate position b, the line 6a to the pump motor 3a will be energized thus starting the motor 3a driving the pump, and recharging pressure to the pressure vessel 3b. If, for example due to leakage, malfunction, failure in the connecting line 6a or the like, the pressure should continue to drop, switch $S_2$ will reach the third position c. In this position an AND-gate 23 will have ground level voltage applied thereto; likewise, ground level voltage will be applied to the input of an inverter 24, so that an OR-gate 25 will receive a signal at one of its input terminals and provide a switching signal to a terminal 26 which, is connected to the control unit 7 (FIG. 1) to block further controlling of the valves 4, 9 so that the system will then operate under operator's control.

Additionally, warning lamp 27 is connected from a voltage source through terminal c of switch $S_2$ to ground and, hence, will provide an indication of malfunction. Lamp 27, generally, thus has in part the function of lamp 8, FIG. 1.

If pressure within the chamber 22, as communicated at pressure input line $P_S$, continues to drop, switch $S_1$ will open and, then, cause signals to appear at the second inputs of AND-gate 23 and OR-gate 25. The situation may arise that, due to malfunction, the switch $S_2$ has not yet effected energization of terminal 26 and hence blocking of values 4 and 9. Blocking, then, is positively commanded by opening of the switching $S_1$ which, thus, provides for a redundant monitoring of pressure level, and energization of terminal 26 through resistor 26a.

The AND-gate 23 is provided to monitor operability of the switch $S_2$. If switch $S_2$ should malfunction, opening of the switch $S_1$ will remove the ground from line 6b and provide a malfunction signal to one input of AND-gate 23. Since, under those conditions, switch $S_2$ has not yet reached its top position, that is terminal c, so that the line from terminal c of switch $S_2$ is open (not yet grounded), AND-gate 23 will switch due to voltage through resistor 23a and will set over the OR-gate 28 a malfunction memory MF, for example in form of a flip-flop (FF) connected to terminal 29. Malfunction memory MF disconnects the ABS, via terminal MF; until reset through terminal $R_S$, which, preferably, should be so arranged that it can be done only manually, for example after maintenance and repair by authorized repair personnel.

As can be seen, the system is fail-safe due to its inherent arrangement, in which, upon failure of switch operation $S_2$, switch $S_1$ will still respond; of course, break in any one of the lines to the And-gate 23 and Or-gate 25 will have the same effect as switch operation due to the loss of pressure. In either case, a ground connection is removed permitting voltage supplied through resistors 23a or 26a to become effective in controlling the logic system of the gates 23, 25.

In accordance with a feature of the invention, operation of the pump motor 3a can readily be monitored, and specifically if the motor 3a operates too often, or for too long a period of time, thus, for example, indicating a leak or break in a brake fluid line. Timing elements 30, 31, 32 are provided in order to check the operating time of the motor 3a.

The timing elements 30, 31, 32 have such timing periods and are so connected through circuit elements 24, 33, 35 that, if motor 3a operates longer than the timing period $T_1$, as determined by the timing circuit 30, a signal is generated which is connected through OR-gate 28 to disable the ABS through terminal 29. Of course, under those conditions, the ABS also provides a warning output signal to the warning indicator 27 (connection not shown) Inverter 33 inverts the signal on line 6a and starts the timing period. The connecting line to the timing circuit 30 is, additionally, connected to a pair of serially connected timing units 31, 32. The timing unit 31 will immediately provide a signal and extend that signal after the input signal applied through line 6a has terminated. The output signal from timing unit 31 is extended by the time period $T_2$. The timing constant $T_2$ of the timing circuit 31 is so dimensioned that, in normal ON-OFF operation, that is, normal connection frequency of the pump motor 3a, the output signal of the timing circuit 31 is terminated before the pump is again connected. The timing circuit 32, with timing constant $T_3$, is reset each time in ordinary operation of the pump. The timing constant $T_3$ is so selected that it provides an output signal only if the pump is connected in shorter intervals than under normal operation for example once or twice in sequence. The timing constant, thus, is greater than that of the usual connection period of the pump plus the ordinary interval period between connecting phases of the pump, for example about twice the normal connection period of the pump. Consequently, the output of the serially connected timing circuits 31, 32 will generate a signal only when the timing circuit 31 provides a signal which, due to the time constant $T_2$ and the rapid reconnection of the pump exceeds the timing period $T_3$.

The system includes further inverters 34, 35 with control terminals 34a and 35a to which a diagnostic test apparatus can be connected to check the operability of the system by coupling appropriate control signals to the terminal 34a or 35a.

The monitoring effected by the AND-gate 23 (FIG. 2) assumes that the tolerance gap of the monitoring thresholds of switches $S_1$ and $S_2$, terminal c, do not overlap, so that, under normal conditions, switch $S_2$ has already switched to terminal position c before, in any event, switch $S_1$ switches, i.e. opens. This may lead to problems in connection with manufacturing tolerances. The embodiment of the switch 63 (FIG. 3) elimintes such tolerance difficulties.

Figure 3:
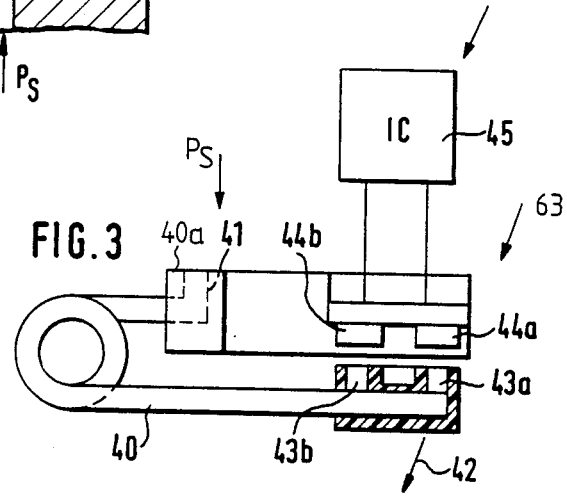
FIG. 3 is a schematic diagram of another type of pressure measuring apparatus.
Figure 4:
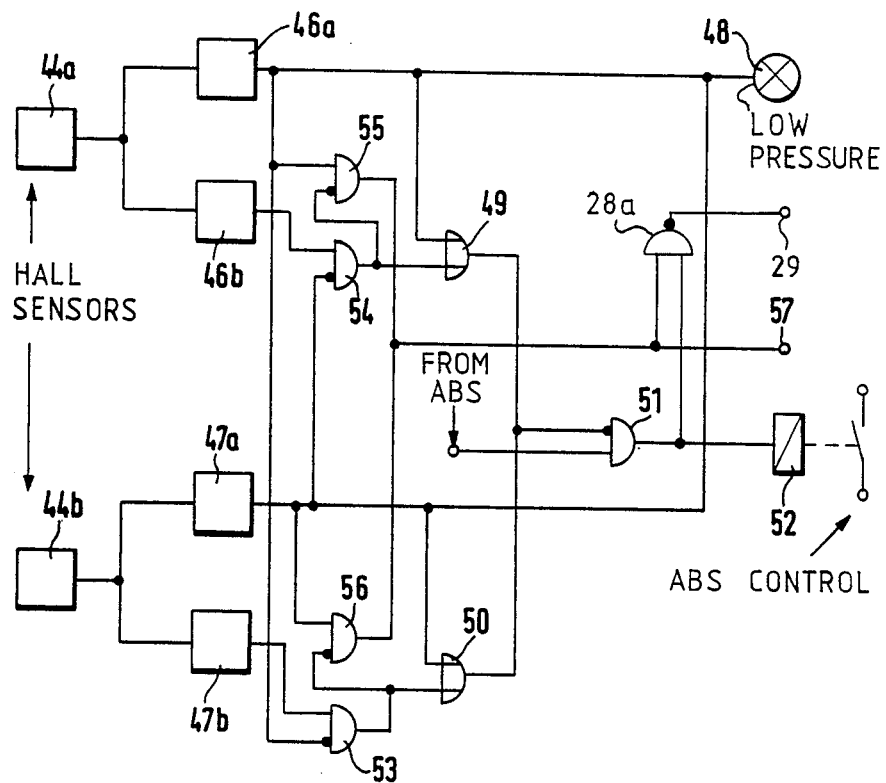
FIG. 4 is a circuit diagram in schematic, block diagram form of a monitoring arrangement utilizing the brake pressure sensing element of FIG. 3, for example.

Embodiment of FIGS. 3 and 4: Redundant measurement of pressure is carried out by means of a Burdon tube and Hall sensors; the respective switching thresholds are obtained by comparator elements.

A pressure sensor 40 in form of a Bourdon tube is secured to a block 40a which receives the pressure signal $P_S$ at a connecting inlet 41. In dependence on applied pressure, the Burdon tube 40 more or less deflects away from the block 40a, in the direction of the arrow 42. Magnets 43a, 43b then will be separated more or less from cooperating Hall sensors 44a, 44b secured to block 40a, and thus the output signals of the Hall sensors will change. These output signals are applied to an evaluation circuit 45, the details of which are shown in FIG. 4. Such an evaluation circuit can be readily constructed as an integrated circuit.

FIG. 4 illustrates, again, in schematic form, the Hall sensors 44a, 44b of FIG. 3. Each sensor 44a, 44b is connected to two respective threshold switches 46a, 46b, 47a, 47b, which provide output signals when signals of predetermined level are applied to the respective switches. The threshold levels of the threshold switches are so selected that, for example, the threshold switch 46a, 47a—even under consideration of tolerances—switches just below a pressure limit of, for example, 100 bar applied at inlet 41 (FIG. 3), and threshold switches 46b and 47b switch at a lower threshold level, for example just below 90 bar, and provide respective output signals at the switching levels.

If one or both of the threshold switches 46a or 47a provide a signal, a warning lamp 48 is connected to light to provide an indication of low pressure. At the same time, OR-gate 49 and/or OR-gate 50 are energized to interrupt current supply to a relay 52, normally controlled from the ABS control unit 7. When relay 52 drops out-which will also be the case if there is general malfunction in the system or a break in the line between AND-gate 51 and relay 52, the ABS operation is interrupted, and pressurized fluid which may drain, that is, which is being circulated, is interrupted until sufficient pressure has, again, built up.

The threshold switches 46b and 47b monitor if the threshold switches 46a and 47a are operable. AND-gates 53 and 54 provide this checking feature, the AND-gates 53, 54 being connected in the following logic connection:

$$S_{47b} \cdot \overline{S_{46a}} \text{ and } S_{46b} \cdot \overline{S_{47a}} \tag{1}$$

If one of the AND-gates 53 or 54 provides an error signal based on this combination of these signals, one of the OR-gates 49 and 50 will disconnect the ABS system via AND-gate 51. At the same time, one of the AND-gate 55 or 56 is also blocked thus removing the signal from terminal 57. Lack of a signal a terminal 57, with relay 52 open, is an indication of malfunction of the system. The ABS is then blocked via AND-gate 28a and terminal 29 connected to malfunction memory MF (FIG. 2) until external repair is carried out; alternatively, or additionally, a malfunction memory like memory MF (FIG. 2) can also be SET, to be RESET only upon external intervention, for example at a repair station. The connections can be made as shown in FIG. 2, for example from terminal MF', from the malfunction memory MF to the ABS control unit 7

Various changes and modifications may be made within the scope of the inventive concept.

We claim:

1. A vehicular automatic braking or anti-skid or anti-brake lock system (ABS) having
    a a pressure supply assembly (3, P) including a pump (P), a pressure supply pump motor (3a) coupled to the pump, and a hydraulic pressure storage vessel (3b) forming a hydraulic pumped pressurized brake fluid supply means;
    a vehicle brake (5),
    a hydraulic brake system having a master brake cylinder (1) receiving the prssurized brake fluid,
    operator controllable means (2a) for controlling deflection of a brake piston in the master brake cylinder,
    an anti brake-lock system (ABS) control unit (7),
    valve means (4, 9) connected to and controlled by said ABS control unit (7) and hydraulically connected to said brake system for selectively controlling application of hydraulic brake fluid to said brake (5) from said master cylinder or from said pumped pressurized brake fluid supply means (3) and, if so controlled by said anti brake-lock system (ABS) control unit (7), for at least one: admission of pressurized hydraulic brake fluid, or maintenance of hydraulic brake fluid pressure, or drainage of brake fluid to a sump (S); and
    safety monitoring means including pressure sensing and transducing means (6, 62, 63) hydraulically coupled to the pumped pressurized brake fluid means (3) for monitoring the pressure of the pumped hydraulic pressure supply means,
    said safety monitoring means comprising
    at least two pressure switch means (62, $S_1$, $S_2$; 63, 44a, 44b, 46a, 46b, 47a, 47b), each coupled to the pumped pressurized brake fluid supply means (3, $P_S$), one switch means ($S_2$) having a higher pressure switching response level for hydraulic pressure than an other switch means ($S_1$);

circuit means (24, 25; 49, 50, 52) connected to the ABS control unit (7) and disabling operation of the valve means (4, 9) under control of said control unit (7) upon response of said one (S2) switch means which has the higher pressure switching response level;

an interconnection and logic circuit (23, 25, 26a, 28, 29; 53, 54, 49, 50, 51, 28a, 29) interconnecting the at least two pressure switch means and generating a malfunction signal upon occurrence of the logical conjunction of
(a) the other of the pressure switch means (S1) which has the lower hydraulic pressure response level responds by changing switching state and
(b) the one pressure switch means (S2) which has the higher response level has not previously responded by not having previously changed switching state;

means (26, 29) for applying said malfunction signal to the anti brake-lock system (ABS) control unit (7) for disabling operation of the valve means (4, 9) under control of the anti-brake-lock system control unit (7); and means (MF) responsive to said malfunction signal for memorizing said malfunction signal and connected to said anti-brake lock system (ABS) control unit (7) for positively disabling said anti-brake lock system control unit (7) even after termination of said malfunction signal.

2. System according to claim 1, comprising hydraulic switch control means including a Bourdon tube (40), said at least two pressure switch means (44a, 44b) being individually operable by the Bourdon tube.

3. System according to claim 2, wherein the switches comprise non-contacting dual-element switches, the switch means responding to respective distance of one of the elements from the other one of the elements of the dual-element switches.

4. System according to claim 2, wherein the switch means comprise non-contacting Hall sensor elements (44a, 44b) and magnet elements (43a, 43b), the Hall elements changing state in dependence on the distance of the magnet elements from the Hall elements.

5. System according to claim 1, wherein the switching response levels of the switch means differ by a predetermined pressure difference.

6. System according to claim 1, wherein (FIGS. 3, 4) each switch means (43a, 44a; 43b, 44b) provides respective output signals upon response of the respective switch means for both switching response levels of hydraulic pressure.

7. System according to claim 1, further including a timing circuit (30) coupled to the pressure supply pump motor (3a), said timing circuit having a timing interval (T1) which generates a supply pressure malfunction output signal if the motor (3a) operates for a period of time longer than the timing period of said timing circuit.

8. Combination according to claim 1, further including a timing circuit combination (31, 32) coupled to the pump motor (3a) and generating a timing signal after a timing interval (T3) if the motor (3a) is reconnected one or more times after termination of a first connection phase and prior to termination of a first predetermined and normal connection time interval (T2).

9. System according to claim 1, comprising hydraulic switch control means including two pistons (20, 21), both subjected to the pressure of said pressure supply means (3, PS) and respectively individually operating said at least two pressure switch means (S1, S2).

10. System according to claim 1, wherein one of the switch means, upon drop in hydraulic pressure, changes from "switch closed" to "switch open" condition, and another one of the switch means, upon drop in hydraulic pressure, changes from "switch open" to "switch closed" condition.

11. System according to claim 10, wherein said other pressure switch means (S1) which has the lower hydraulic pressure response level changes from "switch closed" to "switch open" condition upon drop in pressure, to render said system fail-safe and self-monitoring.

12. System according to claim 1, further including a first timing circuit (30) coupled to the pressure supply pump motor (3a), said first timing circuit having a timing interval (T1) which generates a supply pressure malfunction output signal if the motor (3a) operates for a period of time longer than the first timing period of said first timing circuit;

and a timing circuit combination (31, 32) additionally coupled to the pump motor (3a) and generating an additional malfunction output signal after a second timing interval (3c) if the motor (3a) is reconnected one or more times after termination of a first connection phase and prior to termination of a first predetermined and normal connection time interval (T2), and means (28, 29) combining said supply pressure malfunction output signal and said additional malfunction output signal to provide a pressure supply pump motor malfunction signal.

13. System according to claim 1, wherein said disabling means comprises a malfunction memory (MF).

14. System according to claim 1, wherein said other pressure switch means (S1) which has the lower hydraulic pressure response level changes from "switch closed" to "switch open" condition upon drop in pressure, to render said system fail-safe and self-monitoring.

15. The system of claim 1, wherein the memory means is manually resettable for providing reconnection of the ABS control unit (7) only by manual intervention.

16. System according to claim 15,
wherein said pressure supply pump motor malfunction signal is applied to said manually resettable means.

17. System according to claim 16, wherein said disabling means comprises a malfunction memory (MF).

* * * * *